A. T. DAWSON & J. HORNE.
SIGHTING APPARATUS OF ORDNANCE.
APPLICATION FILED FEB. 6, 1912.

1,188,049.

Patented June 20, 1916.
8 SHEETS—SHEET 8.

Witnesses.

Inventors

UNITED STATES PATENT OFFICE.

ARTHUR TREVOR DAWSON, OF WESTMINSTER, LONDON, AND JAMES HORNE, OF BARROW-IN-FURNESS, ENGLAND, ASSIGNORS TO VICKERS LIMITED, OF WESTMINSTER, ENGLAND.

SIGHTING APPARATUS OF ORDNANCE.

1,188,049.  Specification of Letters Patent.  Patented June 20, 1916.

Application filed February 6, 1912. Serial No. 675,835.

*To all whom it may concern:*

Be it known that we, ARTHUR TREVOR DAWSON, knight, and JAMES HORNE, both subjects of the King of Great Britain, residing, respectively, at Vickers House, Broadway, Westminster, in the county of London, England, and Naval Construction Works, Barrow-in-Furness, in the county of Lancaster, England, have invented certain new and useful Improvements in or Relating to the Sighting Apparatus of Ordnance, of which the following is a specification.

This invention relates to sighting apparatus of the kind in which one of the prisms or reflectors of the sight is mounted in a holder which, during the elevation of the gun, is displaced about a transverse horizontal axis through an angle equal to half the angle of elevation and which can be moved about the said axis independently of the movement of the gun in order to effect range adjustments.

The chief object of our present invention is to avoid the necessity of employing large sighting hoods or large openings in the roof plates of the turret.

According to this invention the holder of the movable reflector or prism forms part of, or is attached to a lever or the like which is connected to a second lever or other suitable device that is adapted to be moved by the gun in elevation and by the range adjusting gear. The said point of connection of the second lever is preferably such that the arc described by the said point if continued, will pass through the axis of the holder carrying the reflector or prism. The end of the second lever may be arranged to engage a sliding block which is free to slide radially on a guide formed at the lower end of the lever which is attached to the said holder. In effect the system of levers provides that the angular movement of the lever attached to the holder will be of a magnitude exactly half that of the lever moving with the gun, either for movements of elevation of the gun or for range adjustment.

We may mount the lever that moves with the gun, directly on the gun trunnion or we may transmit the movement of the gun in elevation thereto through a rocking shaft, the said rocking shaft being connected to the trunnion by a suitable form of parallel link motion.

In order that the said invention may be clearly understood and readily carried into effect, we will describe the same more fully with reference to the accompanying drawings, in which:—

Figure 1 is a side elevation, Fig. 2 a sectional end elevation, and Fig. 3 a plan, of one constructional form of the improved apparatus, which is shown by way of example as applied to a periscopic form of sight. Fig. 4 is a sectional plan showing the deflection and drift gear, Fig. 5 is a sectional plan showing a form of the connection between the lever moved by the gun and the lever appertaining to the movable reflector or prism. Figs. 6 and 7 are respectively a side elevation and an end elevation of the aforesaid parallel link motion connected to the trunnion.

In all these figures like letters of reference indicate similar parts.

A is the sighting periscope supported vertically in a bracket $A^o$ situated on the mounting adjacent to the trunnion. $A'$ is the eyepiece of the said periscope.

B is the deflection dial and C the range dial.

$a$, $a'$ represent the two prisms of the periscope, of which the former is fixed and the latter is carried in the rotary holder $a'^x$.

$A^x$ represents the aforesaid lever moving with the gun in elevation (herein called the "gun lever") and $A'^x$ the lever (herein called the "periscope lever") connecting the lever $A^x$ to the holder $a'^x$.

Figure 1:
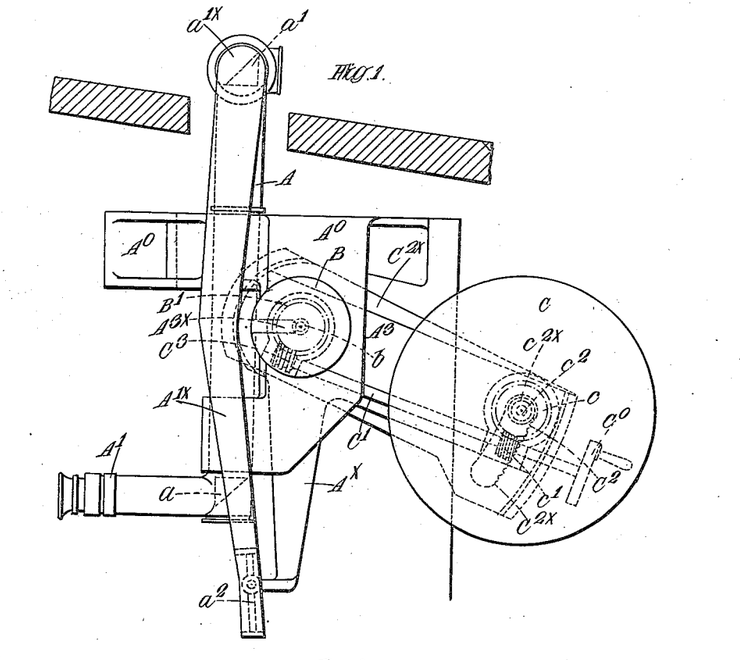
Figures 2, 7:
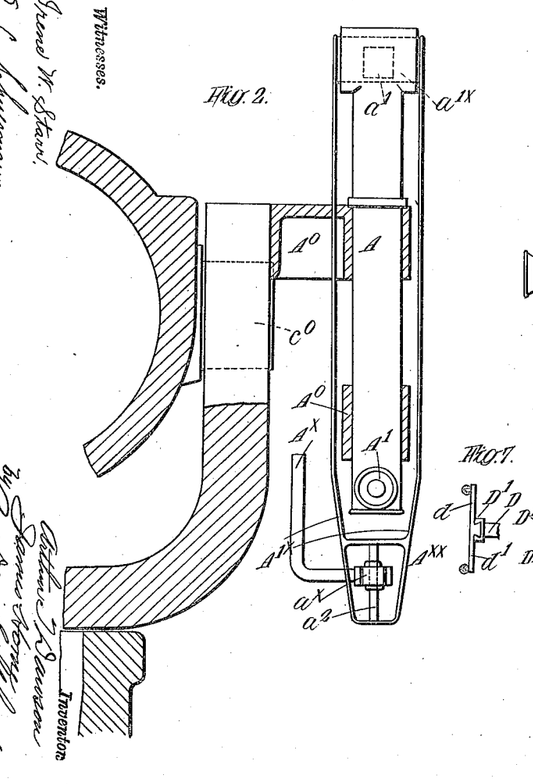
Figure 3:
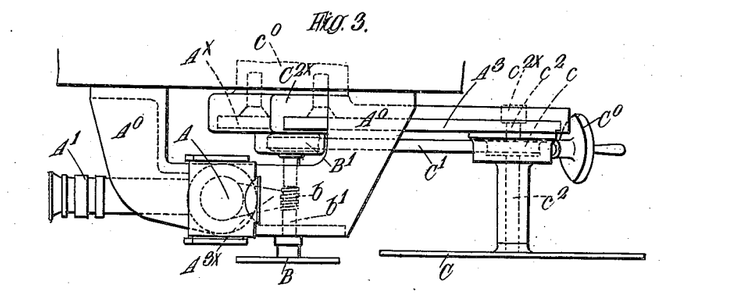

In the example illustrated in Figs. 1, 2 and 3 the periscope lever $A'^x$ is composed of two parallel arms joined together at their lower ends. The said arms are situated on each side of the periscope and connected to each end of the holder $a'^x$ which is in the form of a sleeve pivoted in bearings formed at the upper end of the periscope. By constructing the periscope lever $A'^x$ with two parallel arms joined at their lower ends, any twisting stress which would tend to cause inaccuracy in working is avoided. The lower end of the periscope lever $A'^x$ is furnished with a center pin $a^2$, the axis of which is arranged radial with the axis of rotation of the sleeve $a'^x$ and in the same longitudinal plane as the vertical axis of the periscope; this pin thus constitutes the aforesaid radial guide. The gun lever $A^x$ is formed with a forked end having a bearing in each end of the fork to receive the trunnions of a cross-head $a^x$ (Fig. 5), the said trunnions being parallel to the axis of rotation of the sleeve $a'^x$. The said cross-head $a^x$ is provided with two internally projecting trunnion pins $a^{xx}$ the axes of which are normal to the trunnions engaging with the forked end of the gun lever $A^x$ but which lie in the same plane and intersect with the axes of the said trunnions. These internally projecting trunnion pins $a^{xx}$ are arranged to engage with a sliding block $A^{xx}$ which in turn is carried on the center pin $a^2$ of the periscope lever $A'^x$. This arrangement of center pin, sliding block and cross-head forms a universal joint connection between the gun lever $A^x$ and the periscope lever $A'^x$, thus enabling the small lateral deflection and drift corrections to be applied to the periscope we may alternatively, if desired, employ a universal connection of the ball and socket type for the same purpose.

The gun lever $A^x$ is carried by a member $C^{2x}$ attached to one of the gun trunnions $C^0$, and in order to provide for the relative movement of the upper prism $a'$ of the periscope with respect to the gun for range adjustment, the said lever $A^x$ is formed with a forward extension or arm $A^2$ carrying the sight elevating gear and the range dial C. A worm $c'$ on a shaft $C'$ of the said gear engages with a worm wheel $c$ which is attached to a spindle $c^2$ carrying the range dial C and a pinion $c^{2x}$ which engages with a rack $C^2$ formed on the member $C^{2x}$. This member instead of being attached to the gun trunnion might move in conjunction with the gun trunnions by means of the parallel link motion hereinafter described. The arrangement is such that when the said elevating gear is operated the gun lever $A^x$ is displaced by the aforesaid worm and worm wheel about the gun trunnion and moves the periscope lever $A'^x$ and the upper prism $a'$ of the periscope about the axis of rotation of the sleeve $a'^x$.

In applying the lateral corrections for speed of ship, drift of projectile etc., to the periscope A, the latter is angularly displaced about its vertical axis in the supporting bracket $A^0$, and for this purpose we provide in the example shown a lateral arm $A^{3x}$ on the periscope, engaging with a worm $b$ carried on a transverse spindle $b'$ (Fig. 4) in the bracket $A^0$ and preferably co-axial with the gun trunnion. This worm $b$ operates in conjunction with the graduated deflection dial B or the like in the usual way, excepting that it is capable of endwise movement independently of the spindle $b^x$ of the said dial, in order that the additional adjustment for drift can be imparted to the periscope. For this purpose we provide, in the example shown, a worm wheel $B'$ co-axial with the trunnion and free to rotate in a recess or bearing formed co-axially in the boss $a^3$ of the gun lever $A^x$; this worm wheel is screw threaded internally to engage with a screw threaded plug $b^2$, the inner end of which is formed with a square or rectangular portion $b^{2x}$ engaging in a corresponding hole provided in the boss $a^3$ of the gun lever. This arrangement prevents rotation of the said plug but allows it to move endwise when the worm wheel $B'$ is rotated by a worm $C^3$ on the aforesaid shaft $C'$. The inner end of the spindle $b'$ of the deflection worm $b$ is prolonged and bears against the end of the screwed plug $b^2$, a spring $b'^x$ provided in the interior of the said spindle keeping the latter pressed against the said plug. When the shaft $C'$ is rotated the coöperation of the worm $C^3$ with the worm wheel $B'$ effects an endwise movement of the aforesaid screwed plug $b^2$, which in turn, by bearing on the deflection spindle $b'$, displaces the latter and its worm $b$ against the spring $b'^x$, and causes an angular movement of the arm $A^{3x}$ and the periscope to take place to compensate for the drift of the projectile; by rotating the deflection dial B, the worm $b$ and the arm $A^{3x}$ impart to the periscope the necessary correction for speed of ship, etc.

Figures 4, 5, 6:
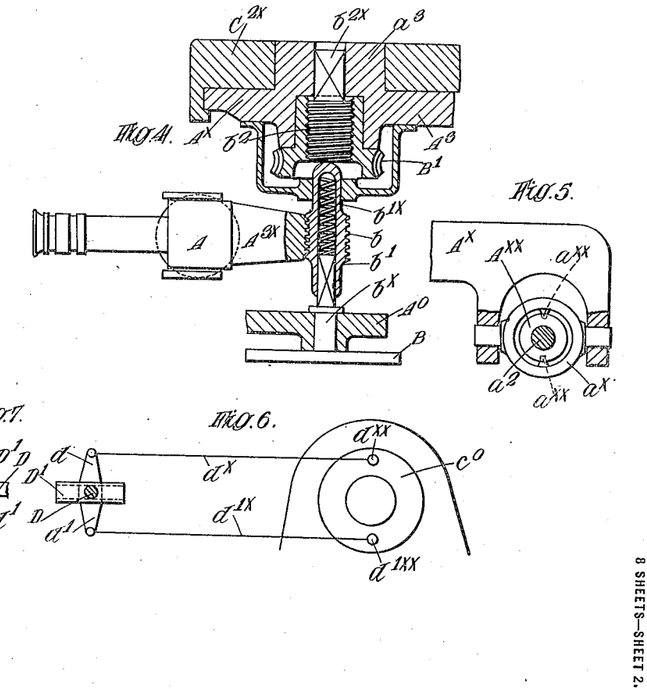
Figure 8:
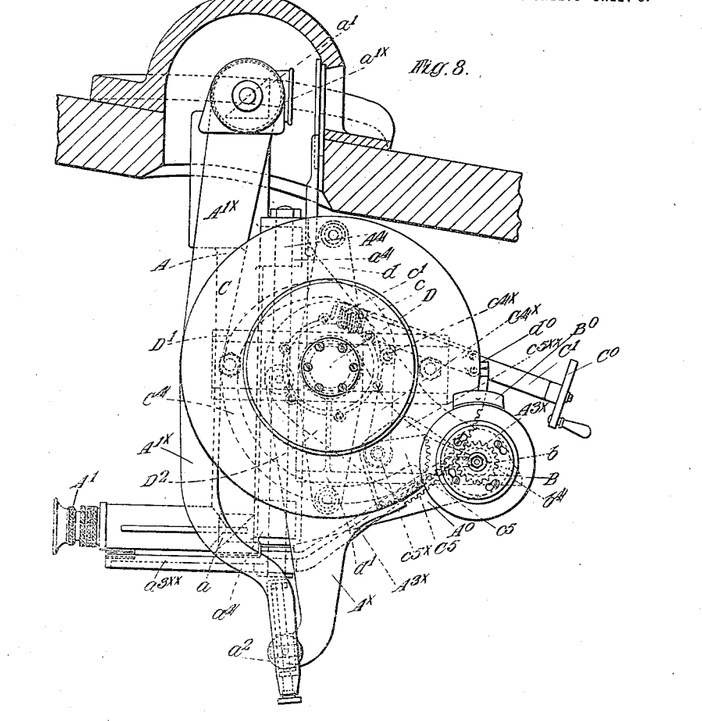
Figs. 8, 9 and 10 are views similar to Figs. 1, 2 and 3 of another constructional form of the sighting apparatus.
Figure 9:
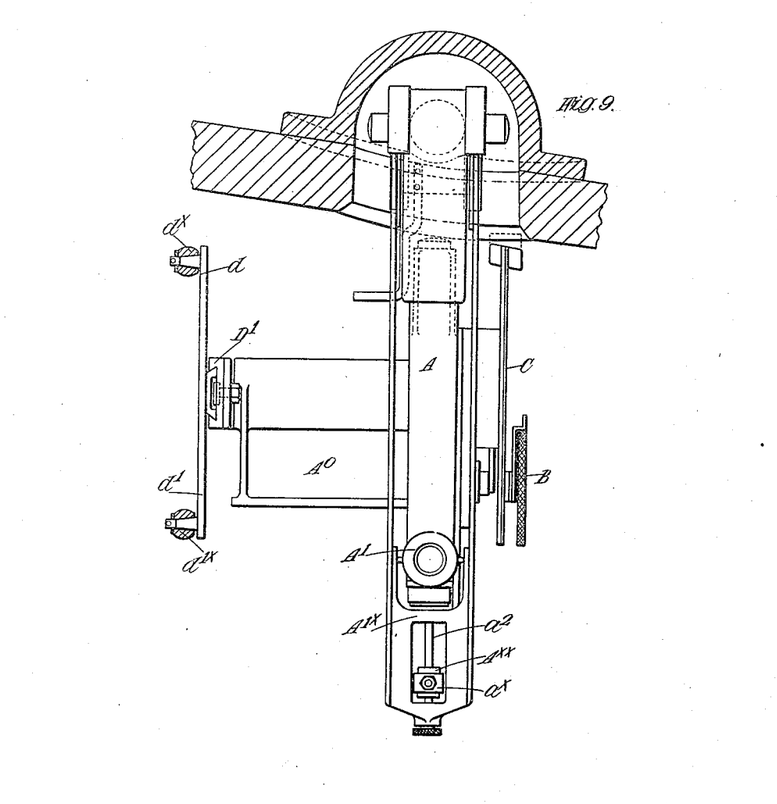
Figure 10:
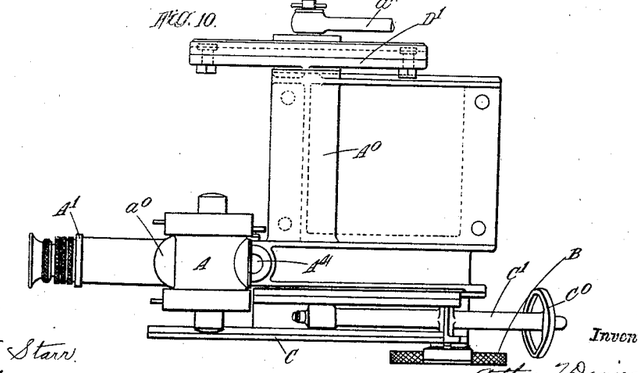

In the example illustrated in Figs. 1 to 3, the gun lever $A^x$ is shown mounted co-axially with the gun trunnion, but as aforesaid, the movement of the gun can be transmitted to the said gun lever through a rocking shaft and a parallel link motion. Figs. 6 and 7 show diagrammatically the method of transmitting this movement, D representing the aforesaid rocking shaft which has a horizontal guide member $D'$ connected thereto. This guide member is formed with a dovetail guide in which is disposed a cross-head having two arms $d$, $d'$, connected by means of parallel links $d^x$, $d'^x$ to two pins $d^{xx}$, $d'^{xx}$ on the trunnion $c^6$. This arrangement provides a correct and constant parallel motion between the gun and the rocking shaft within the limits of the gun elevation angles while the aforesaid guide automatically compensates for any slight variation in length likely to exist or take place between the center of the trunnion and the axis of the rocking shaft. The said rocking shaft is suitably connected to the aforesaid gun lever $A^x$.

In the form of sighting apparatus shown in Figs. 8 to 11 the range dial C is arranged concentric with the aforesaid rocking shaft D (which is connected with the trunnion through the arms $d$, $d'$ and links $d^x$, $d'^x$ as shown in Figs. 6 and 7) whereby the only movement the dial receives is one of rotation when the gun is moved in elevation. We may also arrange the deflection dial B concentric with the range dial and on the same spindle, but in the example shown the range dial and the deflection dial B are mounted on separate spindles. The rocking shaft D is mounted in the fixed bracket $A^0$ carrying the periscope and on this shaft is mounted the gun lever $A^x$ which is connected to the periscope lever $A'^x$ in a similar manner to that hereinbefore described.

The relative angular movement between the sight and the gun for range adjustment may be effected by worm and spur gearing in the manner hereinbefore described with reference to the form of apparatus shown in Figs. 1 to 4, but in the example shown the parts are so constructed that the relative angular movement is effected by means of a spirally formed groove $C^4$ at the back of the range dial C. Advantage may be taken to so form this groove that an even spacing may be obtained for the range graduations on the dial. Rotation of the dial oscillates a lever $C^{4x}$ which is fitted at its outer or free end with a roller $c^{4x}$ engaging with the said groove, the other end being provided with a toothed quadrant $C^5$ gearing with an internally toothed rack $c^5$ formed in the outer wall of a gap $c^{5xx}$ (Fig. 8) in the gun lever $A^x$, the lever $C^{4x}$ being supported on a pivot $c^{5x}$ carried by a member $D^2$ rigidly attached to the rocking shaft D or alternatively attached directly to the gun trunnion.

In the example shown we employ a modified form of the hereinbefore described deflection and drift gear, in which instead of rotating the periscope about its vertical axis for lateral movements, we provide a separate axis pin $A^4$, the periscope A being held in a suitable carrier hinged to the aforesaid axis pin or as shown provided with suitable lugs $a^4$ formed on its body to engage with the said axis pin. The frame or bracket $A^0$ which is attached to a fixed portion of the gun mounting is provided with a casing for supporting the periscope to admit of lateral adjustments being effected about the axis pin $A^4$. Concentrically with the aforesaid member D is mounted the gun lever $A^x$ and also the range dial C, the rotation of which effects, by means of the aforesaid spiral groove $C^4$ and the lever $C^{4x}$, the relative angular adjustment for range between the member $D^2$ carried on the rocking shaft D and the gun lever $A^x$, the latter in turn moving the periscope lever $A'^x$ attached to the sleeve $a'^x$ at the upper end of the periscope. The range adjusting gear, carried by the member $D^2$, is shown as of the usual form comprising a hand wheel $C^0$ which rotates a shaft carrying a worm $c'$ which gears with a worm wheel $c$ at the back of the range dial C. The rotation of the range dial is thereby effected, the range graduations being read by means of an index $d^0$ (Fig. 8) attached to the member $D^2$ on the rocking shaft D. Rotation of this range dial as aforesaid effects an oscillatory movement of the levers $A^x$ and $A'^x$ thereby altering the angular relationship between the prism $a'$ and the gun.

Figure 11:
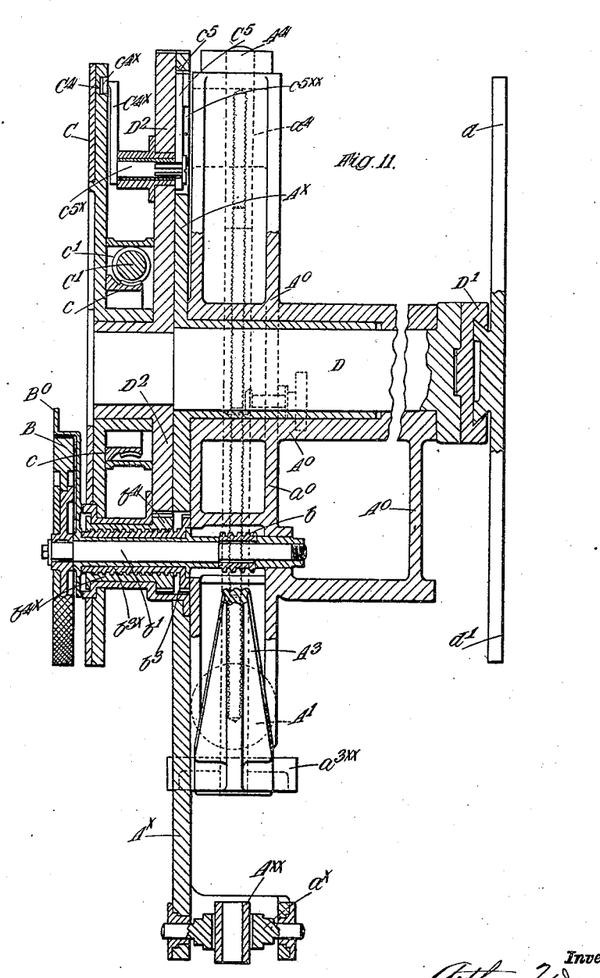
Fig. 11 is a transverse section on an enlarged scale showing more clearly the sight elevation and deflecting gear although it does not truly represent the relative position of the parts.
Figure 12:
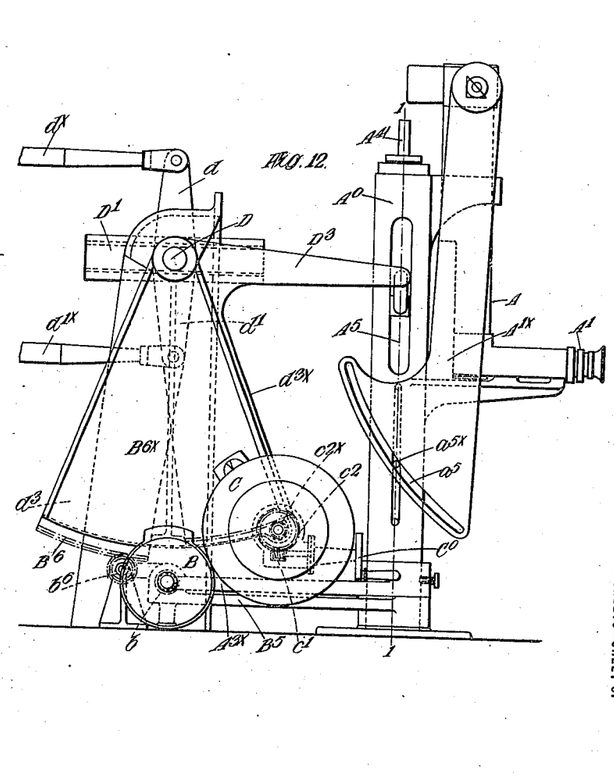
Fig. 12 is a side elevation, Fig. 13 a plan, and Fig. 14 a front elevation of a further constructional form of the sighting apparatus.
Figure 14:
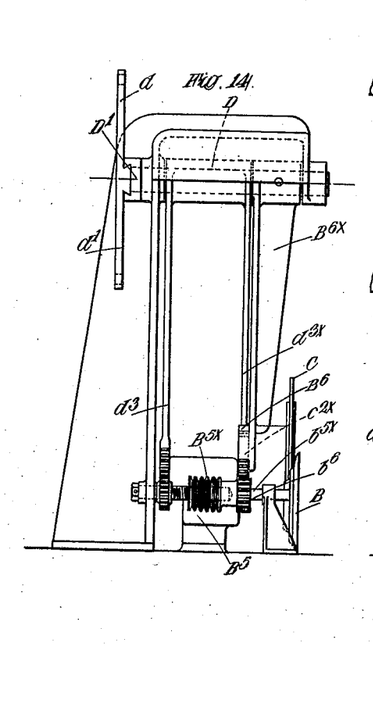
Figures 15, 16, 17:
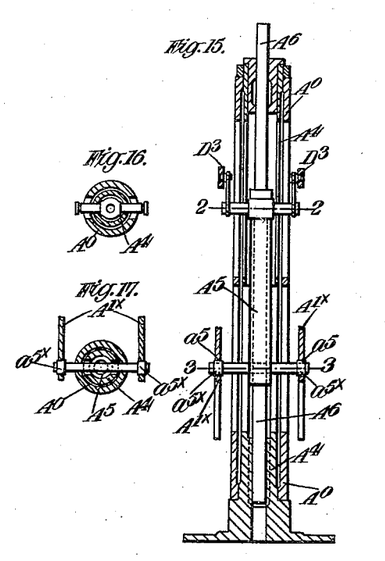
Fig. 15 is a section taken approximately on the line 1—1 of Fig. 12.
Figs. 16 and 17 are sections taken on the lines 2—2 and 3—3 respectively of Fig. 15.
Figure 17:
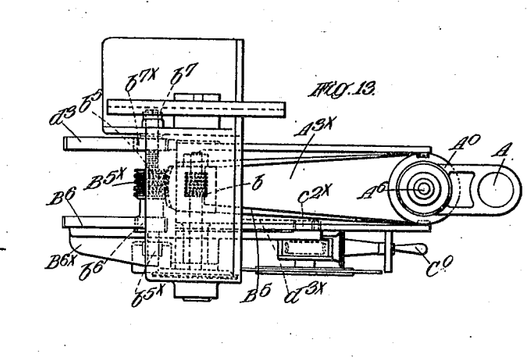
Figure 18:
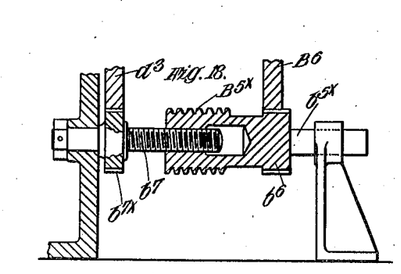
Figs. 18 and 19 are respectively a sectional front elevation and a sectional plan of a form of drift gear.
Figure 19:
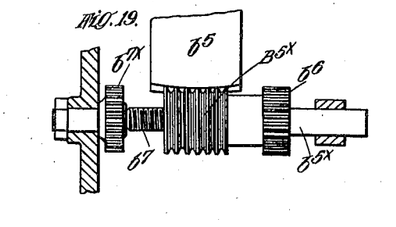

The deflection and drift gear is attached to the supporting frame or bracket $A^0$. In this gear, as shown, we employ the usual form of worm $b$ which is connected to a spindle carrying the dial B. This worm gears with the worm sector $A^{3x}$ which is pivoted concentrically with the axis pin $A^4$ of the periscope and which has a rearward extension $a^{3xx}$ (Fig. 8) to engage a suitable projection or the like formed on the lower surface of the horizontal branch of the periscope. Loosely mounted on the boss of the pointer $B^0$ (which boss or sleeve is in turn loosely carried by the spindle $b'$) is a pinion $b^3$ which engages with a rack formed on the gun lever $A^x$. The said pinion is as shown in Fig. 11 formed with an externally screw-threaded sleeve $b^{3x}$ around which is disposed an internally screw threaded sleeve $b^{4x}$ having a pinion $b^4$ engaging with a rack formed on the member $D^2$. The pinion $b^4$ with the sleeve $b^{4x}$ is arranged so as to be free to rotate in its bearing but is held against endwise movement by collars or other suitable means. When the gun is elevated, thereby causing rotary movement of the rocking shaft D, the two pinions merely rotate together, but if range adjustment be applied, a differential action is produced between the pinions $b^3$, $b^4$ which by means of the screw-threaded sleeves $b^{3x}$, $b^{4x}$ causes an endwise movement of the spindle $b'$ and its worm $b$ to take place, which in turn deflects the sight line of the periscope as aforesaid, to compensate for drift.

In the construction shown in Figs. 12 to 19 angular movement is imparted to the upper prism or reflector of the periscope by means of duplicate periscope levers A'ˣ as hereinbefore described, but the said levers have at their lower ends suitable cam shaped grooves or slots $a^5$ engaging with pins $a^{5x}$ on a cross-head $A^5$ or the like carried on a vertical guide stem $A^6$ or similar support arranged centrally with the aforesaid axis pin $A^4$ about which the periscope is angularly displaced for deflecting adjustments and drift. The said cross-head $A^5$ is so arranged as to move vertically in the hollow axis pin $A^4$ for alterations in elevation or range adjustments and the pins $a^{5x}$ by moving in the grooves $a^5$ of the said levers produce the necessary angular movement of the sleeve $a'^x$ and the tilting of the upper prism $a'$. The cross-head $A^5$ is connected by means of the cross-pin and connecting rods as shown to arms $D^3$ forming part of a toothed segment $d^{3x}$ actuated by the pinion $c^{2x}$ operated from the handle $c^0$ by worm gearing $c'$ $c^2$ (Fig. 12) carried by a member $B^{6x}$ connected to the shaft D. The deflection gear comprises the usual worm $b$ and worm wheel segment $A^{3x}$, the latter being connected to the frame or bracket $A^0$. The said deflection gear is carried on a plate $B^5$ which is formed with a rack member $b^5$ (Figs. 13 and 19) engaging with a rotary cylindrical rack $B^{5x}$ mounted on a spindle $b^{5x}$ carrying a pinion $b^6$ gearing with a toothed segment $B^6$ formed on the member $B^{6x}$ connected to the rocking shaft D. The said spindle $b^{5x}$ is screwed internally to receive a screwed pin $b^7$ forming part of a pinion $b^{7x}$ gearing with a toothed segment $d^3$ moving with the aforesaid toothed segment $d^{3x}$ actuated by the range setting handle $C^0$. Thus when there is any relative movement between the segments $B^6$ and $d^3$ (i. e. when the sight is being set for range) the cylindrical rack $B^{5x}$ moves longitudinally, thereby moving the plate $B^5$ together with the deflection gear and imparting the necessary correction for drift to the periscope.

We do not confine ourselves to the particular forms of range adjusting gear or deflection apparatus and other constructional parts above described as these may be considerably varied without departing from our invention.

We may provide the improved sighting apparatus with calibrating devices of any well known type for effecting the necessary corrections for changes in muzzle velocity or temperature of charge etc. We may also employ our well known system of "follow-the-pointer" gear in conjunction with the range and deflection dials.

What we claim and desire to secure by Letters Patent of the United States is:—

1. In sighting apparatus for ordnance, the combination with a vertically stationary eye piece of the sight, a holder carrying a movable reflector through which the observed object is reflected to the eyepiece, and a bracket moving with the gun in horizontal training only in which bracket the holder is rotatably mounted so as to move about a vertical axis, of a member connected to said holder, a second member connected to the first mentioned member, means for connecting said second member to a part moving with the gun in elevation and depression, means for causing said second member to move during the range adjustments of the sight, and means for causing the reflector holder to move in the bracket during the deflection setting of the sight.

2. In sighting apparatus for ordnance, the combination with a vertically stationary eye-piece of the sight and a holder carrying a movable reflector through which the observed object is deflected to the eye-piece, of a member connected to said holder, deflection adjusting gear for the sighting apparatus, means for causing said member to move during the deflection adjustments of the sighting apparatus, a second member, means for causing said second member to move during the elevation of the gun and the range adjustments of the sighting apparatus, and a universal joint for connecting said member to the first mentioned member at a point which is such that the arc described by the said point about the axis of rotation of the second member will, if continued, pass through the axis of the holder.

3. In periscopic sighting apparatus for ordnance, the combination with a vertically stationary eye piece of the periscope and a holder carrying a movable reflector through which the observed object is reflected to the eye piece, of a member connected to said holder, a rocking shaft, parallel levers connecting said shaft with one of the trunnions so that said shaft moves in unison with the trunnion, a second member mounted co-axially with said shaft, means for connecting said second member to the first mentioned member, so that the first mentioned member moves through half the angle of the second member, a part fixed to said shaft, range adjusting gear interposed between said part and the second member, and deflection adjusting gear interposed between the two members.

4. In periscopic sighting apparatus for ordnance, the combination with a vertically stationary eye piece of the periscope and a holder carrying a movable reflector through which the observed object is reflected to the eye piece, of a lever connected to said holder, a second lever connected to the first mentioned lever, so that the first mentioned member moves through half the angle of the second member, a member moving with the gun in elevation, range adjusting gear interposed between said member and the second lever, said gear comprising a range dial having a cam groove, means carried by said member for angularly displacing said dial, a toothed segment carried by said member, a member on said segment engaging in the cam groove, and teeth formed on the second lever with which teeth said toothed segment engages to transmit movement thereto during angular movements of the range dial.

5. In periscopic sighting apparatus for ordnance, the combination with a vertically stationary eye piece of the periscope and a holder carrying a movable reflector through which the observed object is reflected to the eye piece, of a lever connected to said holder, a second lever connected to the first mentioned lever, a member moving with the gun in elevation, range adjusting gear interposed between said member and second lever, deflection adjusting gear comprising a toothed arc connected to said periscope, a deflection pivot for the periscope and a worm gearing with said toothed arc for rocking the periscope about said pivot, drift gear comprising a pinion mounted on said worm, a screw threaded boss on said pinion, a second pinion mounted on the boss of the first mentioned pinion and rack teeth on the second lever and the aforesaid member for engaging with the first and second mentioned pinions respectively, so that when relative movement takes place between said second lever and said member during range adjustments the worm will be moved axially to rock the periscope about its deflection pivot.

In testimony whereof we affix our signatures in presence of two witnesses.

ARTHUR TREVOR DAWSON.
JAMES HORNE.

Witnesses to signature of Arthur Trevor Dawson:
HENRY KING,
JNO. R. CASWELL.
By James Horne in the presence of—
MARK G. ATKINSON,
HENRY I. McDOWELL.